United States Patent

[11] 3,633,608

[72] Inventors: Ruthard Minkner
Am Donarbrunnen;
Werner Pick, Heiligenrode, both of Germany
[21] Appl. No.: 6,339
[22] Filed: Jan. 28, 1970
[45] Patented: Jan. 11, 1972
[73] Assignee: Regel & Messtechnik G.m.b.H.
Kassel-Bettenhausen, Germany
[32] Priority: Feb. 1, 1969
[33] Germany
[31] P 19 05 026.1

[54] GAS PRESSURE REGULATING VALVE
9 Claims, 4 Drawing Figs.

[52] U.S. Cl. ................................................. 137/220, 137/270, 251/57
[51] Int. Cl. ................................................. G05d 16/06
[50] Field of Search ................................................. 137/270, 504, 495, 503, 494.2, 484.4, 494, 500, 219, 220; 251/31, 63, 37

[56] References Cited
UNITED STATES PATENTS

| | | | |
|---|---|---|---|
| 2,555,334 | 6/1951 | Green | 137/219 X |
| 2,996,074 | 8/1961 | Page et al. | 137/220 |
| 3,130,747 | 4/1964 | Benaway | 137/504 |
| 3,511,259 | 5/1970 | Toure | 137/220 |
| 3,534,763 | 10/1970 | Lucardie | 137/219 |

Primary Examiner—M. Cary Nelson
Assistant Examiner—Robert J. Miller
Attorney—Singer, Stern & Carlberg

ABSTRACT: In a gas pressure regulating valve provided with a straight passage for the gas and having therein a stationary valve member and a pressure-actuated axially slidable valve sleeve, one end of which cooperates with said stationary valve member, the valve sleeve in accordance with the invention is provided between its ends with an annular shoulder subjected to a pressure medium which adjusts the position of the valve sleeve in said passage. This valve sleeve may be reversely inserted in said straight passage so that the valve sleeve may be moved by said pressure medium which adjusts said valve sleeve in a closure or opening direction.

GAS PRESSURE REGULATING VALVE

The invention relates to a gas pressure regulating valve with a stationary valve cone and a slidable valve sleeve with a straight passage, said sleeve being adjustable in relation to the applied adjusting forces between its closed and fully open position into the desired control position.

Gas pressure regulating valves with a straight passage are known, in which the valve cone is arranged stationary and a valve sleeve, through which flows the medium to be regulated, for example illuminating gas, is axially slidable. In a known valve of this type, the valve sleeve is pressed by means of a spring installed under pretension, against the valve cone, namely in closure position. The valve sleeve is furthermore connected with a setting diaphragm which is subjected to the gas pressure in such manner, that it receives an opening force directed against the spring-closure force and accordingly in dependence on the gas pressure reaches an opening position. For the purpose of an accurate adjustment of the valve sleeve, the setting diaphragm in this device is also subjected from the rear side from that space in which the closure spring is disposed, to a gas pressure deviating from the regulated gas pressure, however, accurately adjustable. In this way, the closure spring lies in a gas-impinged chamber and is subjected as the case may be to heavy admixtures of gas, but this diaphragm impinging on two sides ensures a partial pressure equalization on the setting diaphragm and beyond this insures a fine adjustment of the valve sleeve.

Such valves have, in contract to valves of the conventional type of construction in fully opened condition a very small flow resistance. This known construction is, however, unsatisfactory in that the valve sleeve—depending upon the type of construction—upon loss of the driving energy reaches for its actuation either the closure position or the open position, and a reversal or changeover of one and the same valve of the type closing or opening with disturbances, or vice versa, is practically impossible. Likewise unsatisfactory is the fact that the known valves upon breakage of their closure or opening springs, respectively, fully fail—each according to the type of construction,—to reach the closure or open position. In this respect the known gas pressure regulating valves with a straight passage are still in need of improvement.

The object of the present invention, therefore is an improvement over the known valves of the above-described type. Particularly, by means of the invention, a valve is to be created which in simple manner is reversible from the closing to the opening type upon loss of the driving energy for the valve sleeve.

A further object of the invention is a valve of the aforedescribed type, which upon failure of the driving energy for the valve sleeve and the closure or opening force, respectively engaging the same, for example in the shape of a spring force, automatically is closed or opened, respectively under the pressure of the medium flowing through the valve, each according to whether the valve is of the closing or opening type.

A gas pressure regulating valve having a straight passage in which there is disposed a fixed valve plate and a movable valve sleeve which is constantly subjected to a closure or opening force that is responsive to the pressure or quantity of the medium to be regulated and imposes an adjustable opening or closing force. In accordance with the present invention the valve sleeve is provided with an annular surface which is located so as to impose an opening or closing force on the valve sleeve. The annular surface subject to the pressure of the medium may be formed by a shoulder on the valve sleeve.

According to the invention an arrangement is created in which through a simple reversal of direction of the valve sleeve, a reversal of the valve from the closing to the opening type is insured. While with the closing type, the closing forces applied for example by means of pressure springs urge the valve sleeve against the valve seat or valve cone respectively, on account of the pressure acting on the aforementioned annular surface of the valve sleeve, a pressure medium directs the opening force against the closure force. According to the size of this opening force, the valve sleeve adjusts itself in an opening position, which is determined by the equilibrium of the closure and opening forces. With the opening type of valve by contrast, the forces acting constantly in an opening direction engage the valve sleeve, while the forces which act with pressure on the mentioned annular surface are directed in an opposing or closure direction.

The pressure medium which acts upon the mentioned annular surface of the valve sleeve, may consist for example of a hydraulic substance, whose pressure level is adjustable in responsive to the quantity or the pressure of the medium to be regulated by means of the valve, for example, by means of a diaphragm impinged with the regulated pressure of the medium flowing through the valve, whereby the diaphragm in turn acts on a piston guided in a cylinder, the piston transferring the forces exerted on the diaphragm to the pressure medium located in the cylinder for impinging of the annular surface on the valve sleeve.

Ordinarily the closure or opening forces, respectively, engaging on the valve sleeve are applied by means of a pretensioned or biasing spring. This spring, in the embodiment according to the invention, in contrast to known valves is not disposed in a chamber subjected to the pressure of a gas, but in the chamber subjected to hydraulic pressure for the application of adjusting powers. Thereby the effect of any corrosive substances in the gaseous medium to be regulated on the spring is eliminated.

In a modification of the above-described embodiment, the valve sleeve may also possess a gastight or fluidtight, respectively, center section which is guided in the housing and has the form of an annular piston, whose one end is subjected to a pressure medium for the application of the adjusting forces and whose other end is subjected to a pressure medium for the application of a closure or opening force. Suitably, as pressure medium for application of a closure or opening force, respectively, are used hydraulic substances whose pressure level according to the invention, is adjustable by means of a spring-loaded piston in a cylinder serving as a reservoir for the hydraulic fluid. In particularly advantageous manner, the entire arrangement according to the invention, may be made so that the valve sleeve is positioned in a housing insert arranged in the valve housing, said insert being adapted to be offset by 180° in the direction of flow of the medium to be regulated.

As in the above-described arrangement for the purpose of reversal of such a valve from the closing to the opening type, the reversal of direction of the valve sleeve is eliminated for itself along. Rather, the housing insert receiving the valve sleeve may be arranged offset within the valve housing in direction of flow of the medium to be regulated, by 180°, whereby the above-described impingement of the two ends of the center part of the valve sleeve constructed as an annular piston remains unchanged.

A still further object of the invention, is that upon failure of the driving energy for the valve sleeve and the closure or opening force engaging the same, the valve sleeve moves automatically under the pressure of the medium flowing through the valve, into the closure or opening position. This is accomplished in accordance with the invention that the valve sleeve is provided with a second annular surface engaged by the medium to be regulated, so that on account of the engagement of this annular surface, an additional force acts in direction of the closure force or opening force on the valve sleeve. Through this arrangement, depending upon the valve type, it is ensured that the valve at the time of failure of the driving energy for the valve sleeve as well as upon loss of the closure or opening force, respectively, moves into the closure or opening position, respectively.

In the following description, the invention described more in detail on the basis of a few embodiments shown diagrammatically and by way of example in the appended drawings, however, without being restricted to these embodiment.

Figure 1:
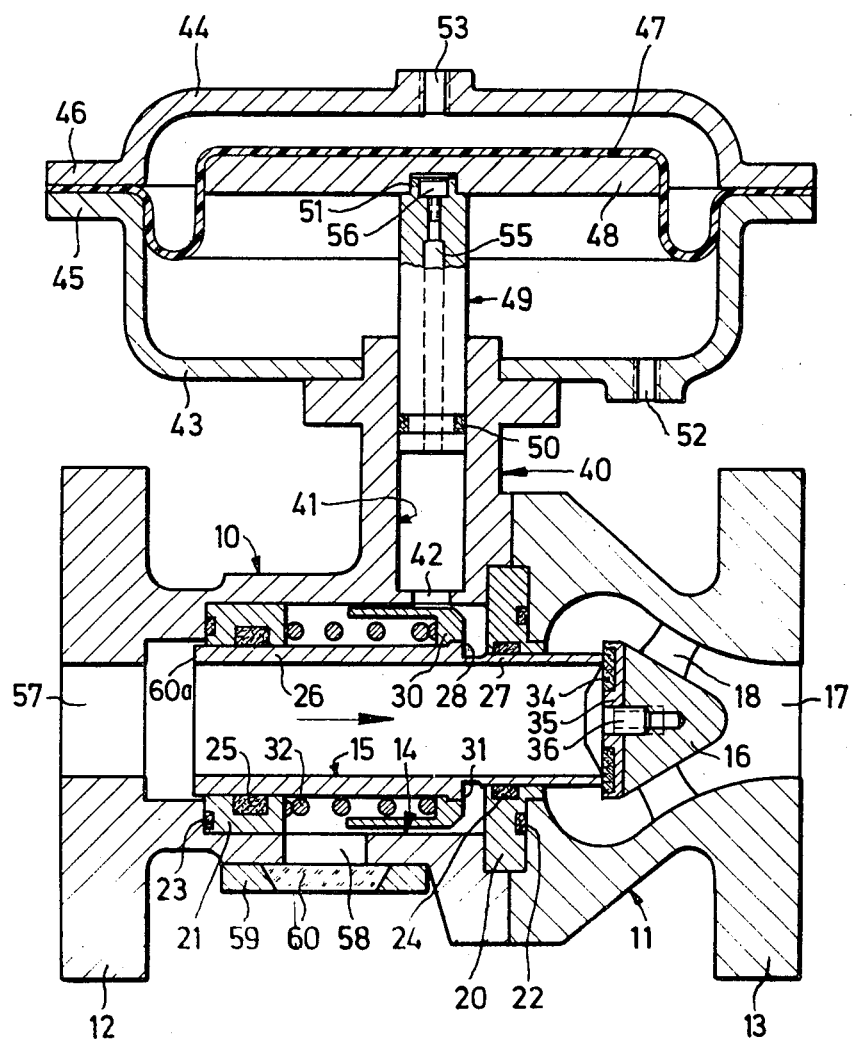
FIG. 1 shows in an axial sectional view a valve of the type which is urged to a normally closed position constructed in accordance with the invention, with a spring-loaded valve sleeve and the arrangement for the application of regulating forces.

Referring to FIG. 1, the valve is provided with a housing consisting of two axially aligned parts 10 and 11. The two parts 10 and 11 are flanged together and have at their outer ends facing away from one another the flanges 12, 13 for attachment of the valve to a conduit system, not shown. Axially and centrally through the housing part 10 extends a countersunk bore 14, in which by means of guide members to be described further in detail, a longitudinally slidable valve sleeve 15 in the manner of a pipe is inserted. Symmetrically to the longitudinal axis of the valve sleeve is arranged fixedly in the other housing part 11 a valve cone 16, which extends into an outflow channel 17. The valve cone 16 is fixedly attached to radial ribs 18, which are arranged somewhat inclined in the outflow channel and form a part of the housing part 11.

The valve sleeve 15 is supported in the vicinity of the valve cone 16 by means of a circular guideplate 20, which is mounted in corresponding annular recesses in the range of the two inner flange connection of the two housing parts 10, 11. In the vicinity of the outer flange 12 of the housing part 10 is inserted in the bore 14 a circular guide member 21 for the left-hand end of the valve sleeve 15. Both guide members 20 and 21 are sealed with respect to the housing parts by means of annular packings 22, 23 and with respect to the valve sleeve by means of annular packings 24, 25, so as to be sealed against the medium flowing through the valve, however, in such a manner that the valve sleeve 15 is slidable in direction of its longitudinal axis.

The valve sleeve 15 consists of a tubular section 26 adjacent to the flange 12 of the housing part 10 and a tubular section 27 of smaller exterior diameter arranged adjacent to the valve cone 16 of the housing part 11. The outer diameter of the sleeve section 27 as already started is reduced as compared with the outer diameter of the sleeve section 26, so that at the transition point of the two sleeve sections a circular annular surface 28 is formed. On the thicker-walled valve sleeve section 26 is fixedly mounted at the transition point with the thinner-walled valve sleeve section 27 a tubular abutment 30. The abutment 30 is seated on a projecting annular shoulder 31 provided on the valve sleeve section 26 in such manner, that it transmits axially directed forces in the direction of the valve cone 16 to the valve sleeve. Between the abutment 30 and the left-hand guide member 21 is arranged a biasing or pretensioned helical spring 32, which urges the front end of the valve sleeve section 27 adjacent a valve seat toward the valve cone 16. The valve cone 16 possesses in the area of its contact surface cooperating with the aforementioned front end of the valve sleeve section 27 an annular seal 34, which is seated on a carrier plate 35, which is fixedly connected by means of a centrally disposed fastening screw 36 to the larger end face of the valve cone 16.

The housing part 10 of the valve has a lateral housing extension 40 projecting substantially perpendicularly to the longitudinal axis of the valve sleeve. This extension 40 is provided with a cylindrical bore 41 which by means of a small aperture 42 is in communication with the bore 14 in the housing part 10. On the upper end of the extension 40 facing away from the housing part 10 is connected a diaphragm housing which consists of the two housing parts 43 and 44. These housing parts 43, 44 are fixedly connected with one another by means of horizontal flanges 45 and 46. In the diaphragm housing is located a cup-shaped diaphragm 47 whose outer edge is fixedly clamped between the housing flanges 45 and 46. The center portion of this cup-shaped diaphragm 47 has associated therewith a diaphragm plate 48, which on its part cooperates with a piston 49 for the transfer of pressure forces. This piston 49 is guided longitudinally slidably in the cylindrical bore 41 of the extension 40 and is sealed with respect to the cylinder walls by means of a ring seal 50. The end of the piston facing away from the cylindrical bore 41 has a hollow cylindrical projection 51, which is inserted in a corresponding central pocket bore in the diaphragm plate 48.

The housing part 43 connected with the housing extension 40 is provided with a bore 52, so that the housing chamber lying below the cup-diaphragm 47 may be in communication with the atmosphere or with a source of gas pressure to be regulated. The other housing part 44 of the diaphragm housing is provided with a central bore 53, to which is connected a pipeline, not shown. By means of this bore 53, the cup-diaphragm may be subjected to a pressure medium in dependence on the pressure or the quantity of the medium to be regulated by means of the above-described valve, for example, illuminating gas.

The chamber formed between the outer walls of the valve sleeve 15 and the countersunk bore 14 in the housing part 10 as well as the cylindrical bore 41 in the housing extension 40 is filled with hydraulic fluid. For introducing of the hydraulic fluid, the housing part 43 of the diaphragm housing with the cup-discharge 47, the diaphragm plate 48 and the piston 49 is removed. After the hydraulic fluid has been introduced into the cylindrical bore 41 into the housing extension 40, first the piston 49 is inserted in the cylindrical bore 41 and is pushed so far into the cylindrical bore 41 until hydraulic fluid passes out at the upper end of the piston 49 through the bore 55. Then the bore 55 by means of a sealing screw 56 insertable in a threaded section on the upper end of this bore, is closed. Thereupon the cup-shaped diaphragm 47 is disposed with the diaphragm plate 48 in such manner that the cylindrical extension 51 of the piston 49 enters in the corresponding pocket bore in the diaphragm plate. Thereafter the housing part 44 of the diaphragm housing is placed on the lower part 43 of the diaphragm housing and by means of connection means, not shown, the flanges 45, 46 are fixedly connected with each other to unite the housing parts 43 and 44 with the diaphragm 47 therebetween. Then the passage bore 53 in the upper housing part 44 is attached to a conduit which supplies a pressure medium for the purpose of engaging that side of the cup-diaphragm 47 which is disposed opposite the piston 49.

In the operation of the valve, the valve sleeve 15 is disposed in a position between its fully open and fully closed position. This position of the valve sleeve adjusts itself in accordance with the pressure means acting on the cup-diaphragm 47 through the bore 53 in the diaphragm housing part 44, in such manner, that for each open position of the valve sleeve, equilibrium prevails between the hydraulic forces acting on the annular surface 28 of the valve sleeve and the forces produced by the spring 32 and of the starting pressure which acts in opposite direction, namely, in closure direction on the valve sleeve. In this connection it is to be noted that annular surface 28 is a result of the difference in outside diameters of the sections 26 and 27. The annular surface 28 plus the annular surface of the member 60 provide a greater surface area than the annular surface area against which the spring 32 bears so that the total pressure force on the forward face including the annular surface 28 is greater than the pressure force on the opposite face. In this manner the pressure force of fluid from the chamber 41 which provides a pressure corresponding to the pressure of gas flow is operative to oppose the force of the biasing spring 32 and thereby regulate the position of the valve sleeve 15 relative to the valve member 16 in accordance with the variation in gas flow through the gaslines. From the inlet channel 57 in the range of the flange 12 of the housing part 10, the flow medium passes through the valve sleeve and to the outlet channel 17 of the housing part 11, whereby in the annular gap, which if formed in an open position of the valve sleeve between the end of the valve sleeve adjacent to the valve cone 16 and the valve cone, a throttling of the flow medium takes place.

Upon failure of the driving energy for the valve sleeve 15, such as a loss of the hydraulic pressure to act upon the cup-diaphragm 47 and therewith on the annular surface 28 of the valve sleeve, the valve sleeve is urged under the action of the spring 32 with the front end of the sleeve section 27 against the seal 34 on the valve cone 16 and accordingly the valve is closed. The movement to the closed position is assisted by the gas flow through the inlet 57. The gas applies a pressure force against annular surface on the left end of the section 26 of the sleeve 15. Thus the pressure force on the left end of the sleeve and the biasing spring 32 act in tandem to move the valve sleeve 15 toward the closed position shown.

Also upon breakage of the closure spring 32, the valve sleeve 15 upon failure of its driving force moves into the closure position, as on both oppositely disposed ends of the valve sleeve will act the pressure of the medium flowing through the valve sleeve. The pressure engagement surface of the left-hand end adjacent the inlet channel 57 is greater than the right-hand end surface of the valve sleeve facing the valve cone, which necessarily results in a sliding force on the valve sleeve in closure direction. Then there also exists in the annular gap between valve cone and the adjacent end face of the valve sleeve a greater velocity of flow than in the intake channel 57, so that in view of this increased velocity of flow in the mentioned annular gap the front end of the valve sleeve adjacent the valve cone is subjected to a lower flow pressure.

In the valve illustrated in FIG. 1, the wall of the housing part 10 is provided between its ends with an aperture 58 extending perpendicularly to the longitudinal axis of the valve. This aperture is in the present case is of no significance and is closed liquidtight by a cuff 59 fixedly attached to the housing and a closure member 60.

Figure 2:
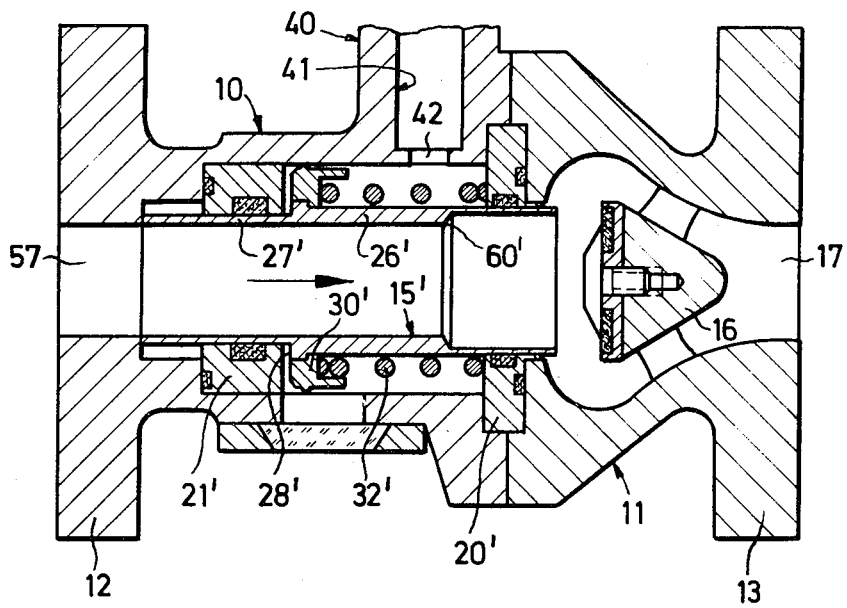
FIG. 2 shows a valve of the type which is urged to a normally open position embodying the structure of the present invention.

The embodiment of the valve according to the invention illustrated in FIG. 2 differs from the embodiment according to FIG. 1 primarily as regards to the arrangement of the valve sleeve.

In this respect in the following, reference is made solely to the arrangement of the valve sleeve, whereby for the same parts similar reference characters are utilized, however, characterized by a prime mark.

In the embodiment according to FIG. 2, the valve sleeve 15 with respect to the flow direction of the medium flowing through the valve is arranged turned around 180° as compared with the embodiment shown in FIG. 1. The valve sleeve 15' is again guided longitudinally slidable by means of the axially spaced guide members 20', 21'. The thick-walled valve sleeve section 26' is, however in this embodiment disposed on the outlet side, and the thinner-walled valve sleeve section 27' faces the inlet side of the valve. The cylindrical helical spring 32' extends in this embodiment between the guide 20' adjacent the valve cone 16 and the abutment 30' axially fixedly connected with the valve sleeve in such manner, that the spring force acts in the opening direction on the valve sleeve. In deviation from the construction of the valve sleeve according to FIG. 1, the valve sleeve according to FIG. 2 is inwardly offset on the side adjacent the valve cone, so that an inner annular surface 60' is formed.

In this valve, the valve sleeve, upon failure of its driving energy, as has been described in detail in connection with FIG. 1, moves under the action of the spring 32' into the opening position shown in the drawing. Just like the valve shown in FIG. 1 of the closing type, the valve sleeve in the valve according to FIG. 2 moves also upon loss of the driving energy into the opening position, if the spring 32' should break. As apparent from FIG. 2, the end surface of the valve sleeve adjacent to the intake channel is substantially smaller in area than the annular surface 60 adjacent to the valve cone, so that on account of the pressure acting on these two surfaces, which pressure is exerted by the medium flowing through the valve sleeve, a sliding force acting in opening direction preponderates so that the valve sleeve moves into a valve opening position. This sliding of the valve sleeve into opening position takes place also when the valve sleeve is disposed initially in closure position, which is easily understood from FIG. 2.

Figure 3:
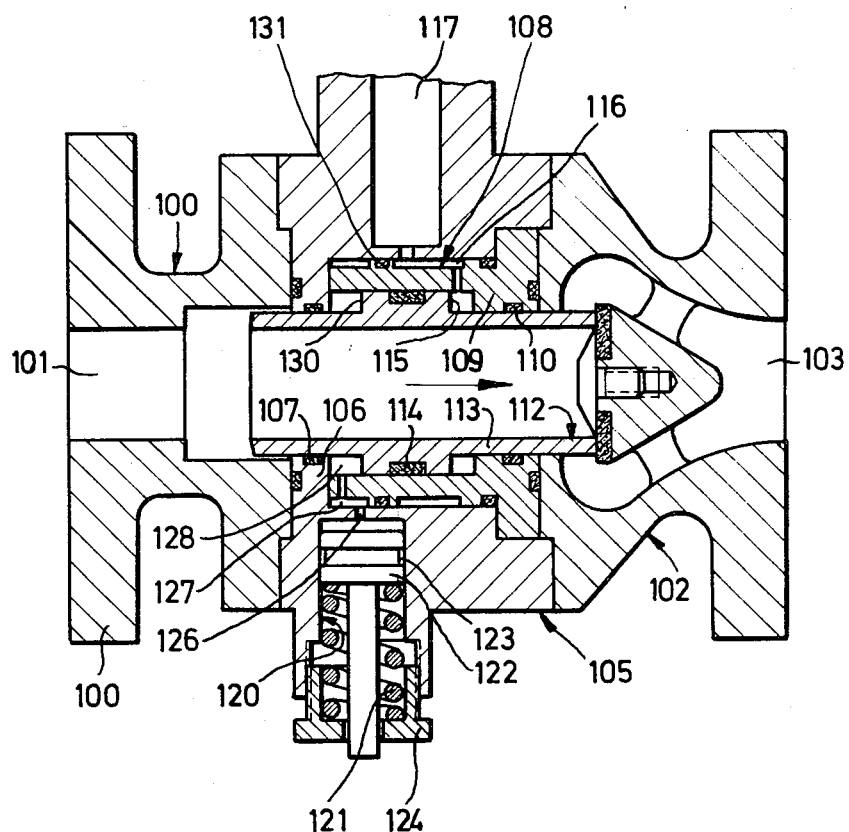
FIG. 3 shows another embodiment of a closing type of the valve with application of the closure forces by means of pressure engagement on an annular surface of the valve sleeve, and FIG. 4 a modification of the valve shown in FIG. 3, however, arranged so as to provide a valve of the opening type.
Figure 4:
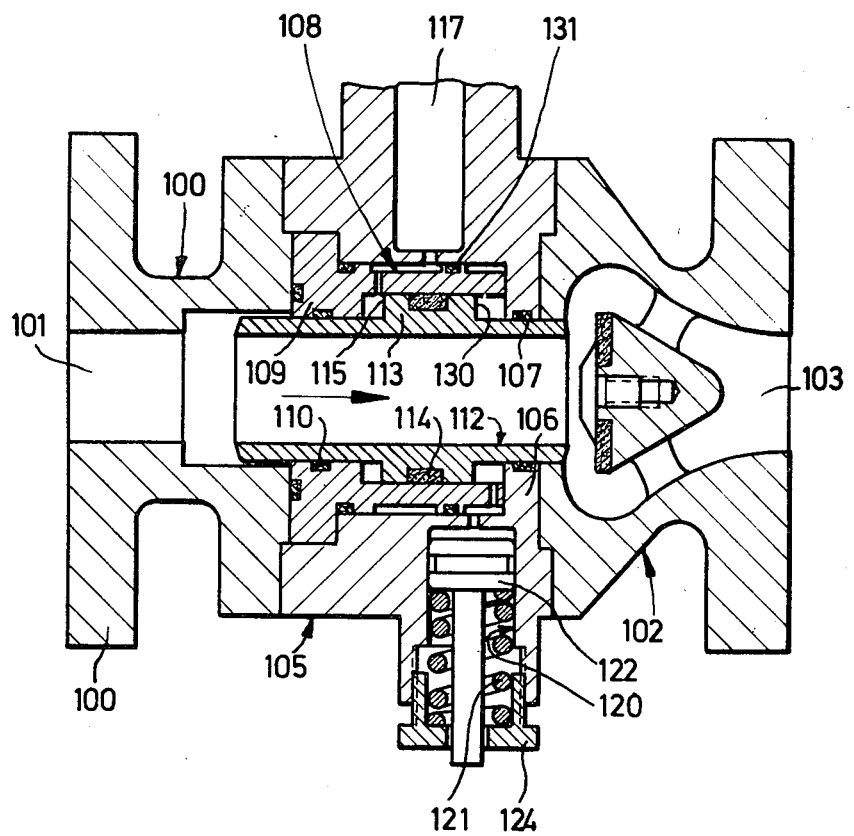

In FIGS. 3 and 4 are described embodiments of the valve in accordance with the invention, in which, in place of the spring engaging the valve sleeve (FIGS. 1 and 2), a hydraulic system is provided for application of the closure of opening forces respectively, which constantly act upon the valve sleeve, as will be described below in greater detail. These embodiments employ for application of the adjusting forces the same construction as in the embodiments according to FIG. 1 and 2, namely, a hydraulic system provided with an actuating diaphragm which is subjected to pressure, so that in this respect, no explanation of this structure is necessary.

Between the valve housing part 100 on the inlet end with the inlet channel 101 and the other housing part 102 on the outlet end with the outlet channel 103 is inserted a center part 105 which is connected in fluid-sealed manner with the housing parts 100 and 102. Coaxially to the inlet channel 101 in the housing part 100 extends through the center part 105 an offset bore, whose first portion 106 serves as a guide 21 similar to the valve in FIG. 1. A packing 107 in this portion 106 serves as a support for the valve sleeve end on the inlet side. In the other portion of the offset bore which widens toward the valve cone is inserted a guide sleeve 108, whose portion 109 adjacent to the housing part 102 serves together with a packing 110 for the longitudinally slidable support of the other end of the valve sleeve.

The valve sleeve 112 is provided approximately in its center with an annular collar constructed as an annular piston 113, which is inserted in a countersunk section of the guide sleeve 108 constructed as guide cylinder and is sealed by means of a packing 114. The end face of the annular ring piston adjacent the valve cone is subjected through an annular gap 116 to hydraulic fluid pressure from a cylinder 117 which serves for the application of adjusting forces on the valve sleeve 112. The cylinder 117 is arranged in the center part 105 and is similar in function to the cylinder 41 in the valves according to FIGS. 1 and 2. In this cylinder is arranged as with the valves according to FIGS. 1 and 2, a piston actuatable by means of an actuating diaphragm in dependence on the pressure or the quantity of the medium to be regulated, said piston as with the previously described valves determining the pressure level of the hydraulic medium in the cylinder 117 and therewith the impingement of the annular piston surface 115. In these FIGS. 3 and 4 the illustration of the piston and the diaphragm arrangement cooperating with the actuating diaphragm has been omitted, as this is identical with the arrangement shown in FIG. 1.

In the center part 105 is arranged a further cylinder 120 which extends perpendicularly to the axis of the valve. In this cylinder is guided longitudinally slidably a piston 122 loaded by a spring 121. The piston 127 is sealed with respect to the cylinder by an annular packing 123. The spring 121 acting on the piston 122 is supported by a cover, 124 threaded into the outer enlarged bore of the cylinder 120. The chamber between the cover 124 and the rear face of the piston 122, in which the spring 121 is positioned, is in communication with the atmosphere, so that a free movability of the piston 122 in the cylinder 120 is insured without compression of the medium located in this chamber, as a rule, air. The chamber of the cylinder 120 lying in front of the piston 122 is in communication through passages 126 with the inlet side 130 of the valve sleeve 112, so that this annular piston side is impinged with hydraulic fluid which is disposed in the cylinder 120 in front of the piston 122. By means of a packing 131, the annular gaps 116 and 127 associated with the different hydraulic systems are sealed separately from one another.

In the embodiment of the valve according to the invention, shown in FIG. 3, which pertains to the closing type, the valve sleeve adjusts itself in dependence on the hydraulic-pressure impingement on both sides of the annular piston 113 in an opening position between maximum opening and closure position, so that through the particular condition of equilibrium of the annular piston surfaces 115 and 130 in view of the impingement, the open position is attained.

Upon failure of the driving energy of the adjusting forces, as may easily be inferred from FIG. 3, the valve sleeve in this embodiment of the valve is subjected to the effect of the pressure of the hydraulic fluid from the cylinder 120, and on account of the spring force acting on the piston 123 moves into the closure position.

In the valve shown in FIG. 4, the center part 105 with the guide sleeve 108 and the valve sleeve 112 therein is reversed about 180° with respect to the direction of the flow medium when compared with the embodiment according to FIG. 3. Accordingly this embodiment of the valve is one of the opening type. Furthermore, the construction and operation of the valve shown in FIG. 4 are identical with the embodiment of the valve shown in FIG. 3, whereby the valve sleeve in this embodiment upon failure of the driving force for the application of the adjusting forces to the valve sleeve moves into the opening position.

Of course, in the valve embodiments according to FIGS. 3 and 4, it is possible to employ in the same manner as in the valve embodiments according to FIGS. 1 and 2, counter bored valve sleeves so that upon failure of the existing hydraulic system for the application of the closure or opening forces, respectively, the valve sleeves under the action of the pressure impingements of the medium passing through the valve, are moved automatically into the closure or opening position, respectively.

What we claim is:

1. A gas pressure regulating valve for regulating the pressure in a gas line comprising a housing, a straight passage through said housing, a stationary valve member in said passage, a tubular valve sleeve mounted for lengthwise movement in said passage between a closed position against said valve member to cut off gas flow through said passage and a position spaced from said valve member to permit flow through said passage, biasing means including fluid pressure means disposed out of the flow of the gas for applying a biasing force on said valve sleeve to position said valve sleeve relative to said valve member, and an annular surface on said valve sleeve for transmitting a regulating fluid pressure force corresponding to the pressure of the gas in the gas line to said valve sleeve, said annular surface means being located so that the fluid pressure force opposes the force of said biasing means thereby to adjust the position of the valve relative to said stationary valve member.

2. The gas pressure regulating valve according to claim 1 wherein said biasing means applies a force normally biasing said valve sleeve to a closed position against said valve means, and wherein said annular surface is located so as to oppose said biasing force and urge said valve sleeve toward said open position spaced from said valve member.

3. The gas pressure regulating member according to claim 1 wherein said biasing means applies a force normally biasing said valve sleeve to an open position spaced from said valve member, and wherein said annular surface is located so as to oppose said biasing force and urge said valve sleeve toward said closed position.

4. The gas pressure regulating valve according to claim 1 wherein said valve sleeve comprises two sections of different diameter, and said annular surface means comprises an annular shoulder formed at the juncture of said two sections.

5. The gas pressure regulating valve according to claim 1 wherein said slidable valve sleeve includes an enlarged fluid-tight center section, said center section comprising an annular piston having two lengthwise spaced annular shoulders wherein one of said shoulders comprises said annular surface and the other of said shoulder is subject to said biasing means.

6. The gas pressure regulating valve according to claim 1 wherein said biasing means is solely a hydraulic fluid, and wherein said biasing force of said hydraulic fluid is established by a cylinder attached to said housing and a piston adjustably positionable in said cylinder.

7. The gas pressure regulating valve according to claim 5 wherein said housing includes a valve housing insert in which said valve sleeve is axially slidably supported, said valve housing insert being mounted on said housing so as to be reversible through 180° in said passage so that in one position of said valve housing insert said valve sleeve is urged to a normally closed position and in the 180° reversed position said valve sleeve is normally urged to an open position.

8. The gas pressure regulating valve according to claim 1 wherein said valve sleeve is provided with a second annular surface, said second annular surface being located so as to be subjected to the pressure of the gas medium to be regulated whereby the pressure of the gas medium is additive with said biasing force to urge said valve sleeve to said closing position when said regulating pressure force fails.

9. The gas pressure regulating valve according to claim 1 wherein said valve sleeve is provided with a second annular surface, said annular surface being located so as to be subject to the pressure of the gas medium to be regulated whereby the pressure of the gas medium is additive with said biasing force to urge said valve sleeve to said open position when said regulating pressure force fails.

* * * * *